O. H. J. KRAG.
AUTOMATIC REPEATING FIREARM.
APPLICATION FILED AUG. 18, 1911.
1,028,032.
Patented May 28, 1912.
4 SHEETS—SHEET 2.
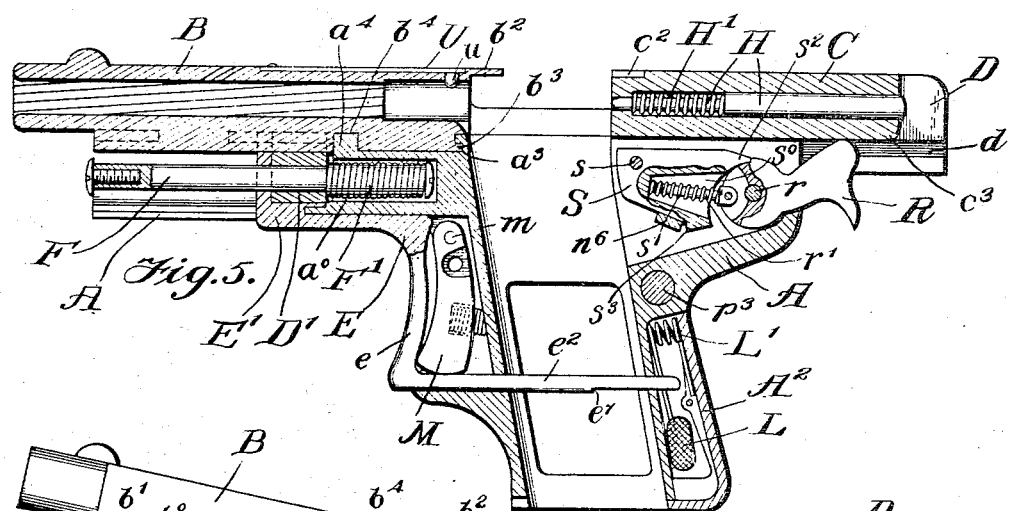
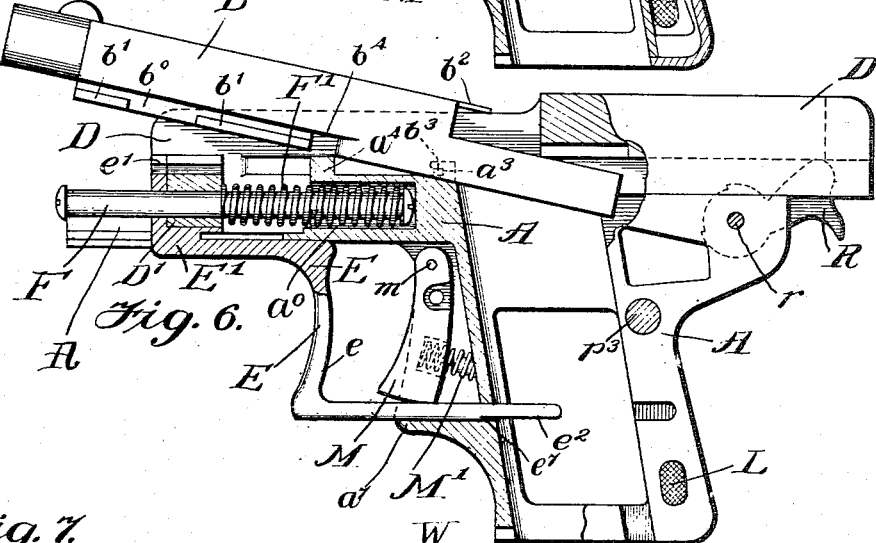
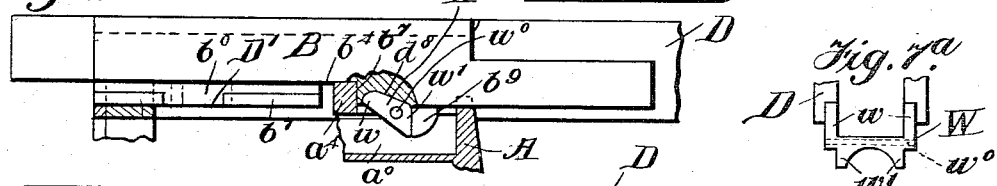
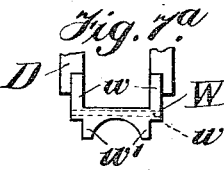
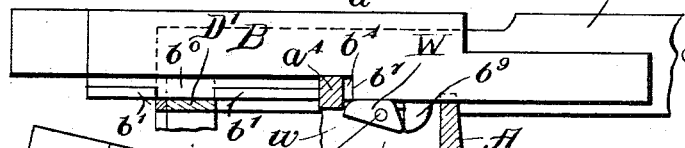

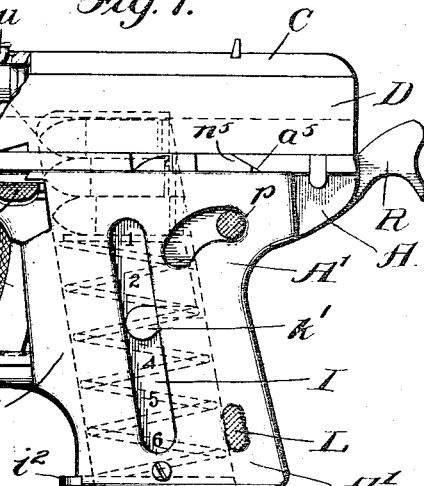
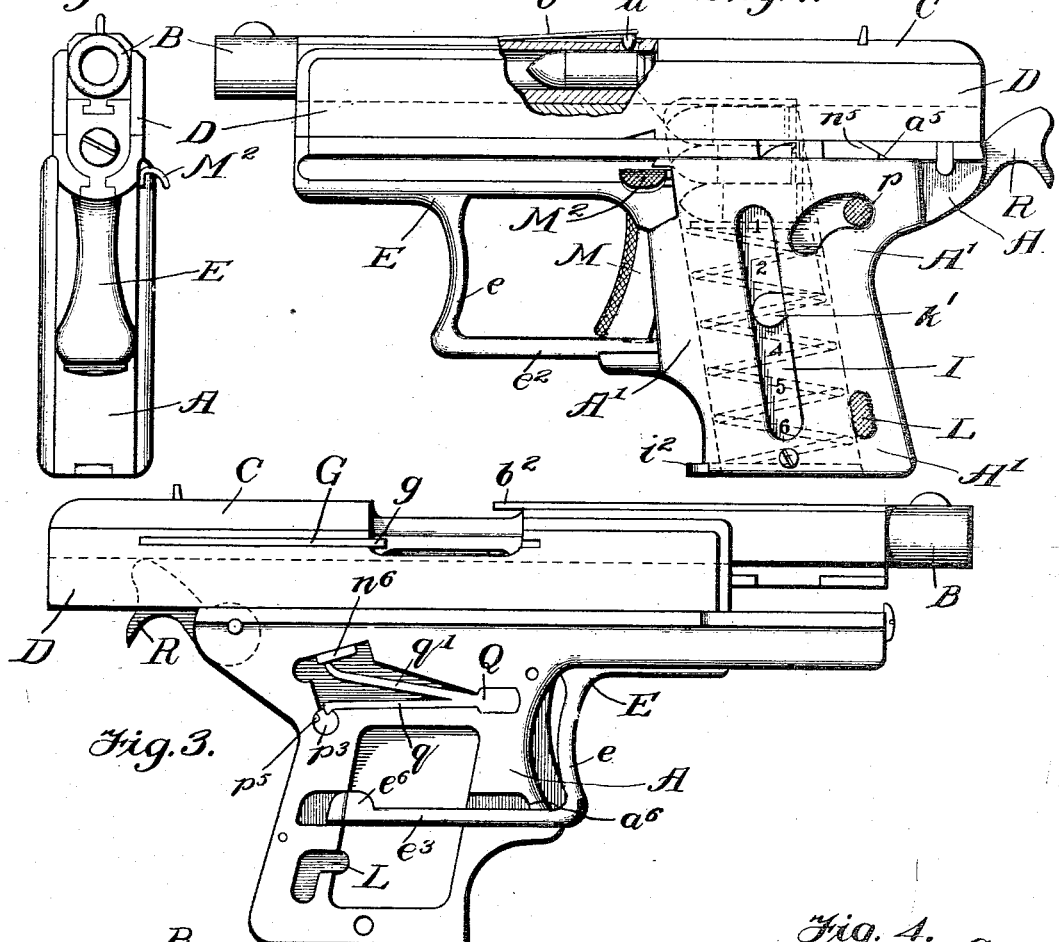
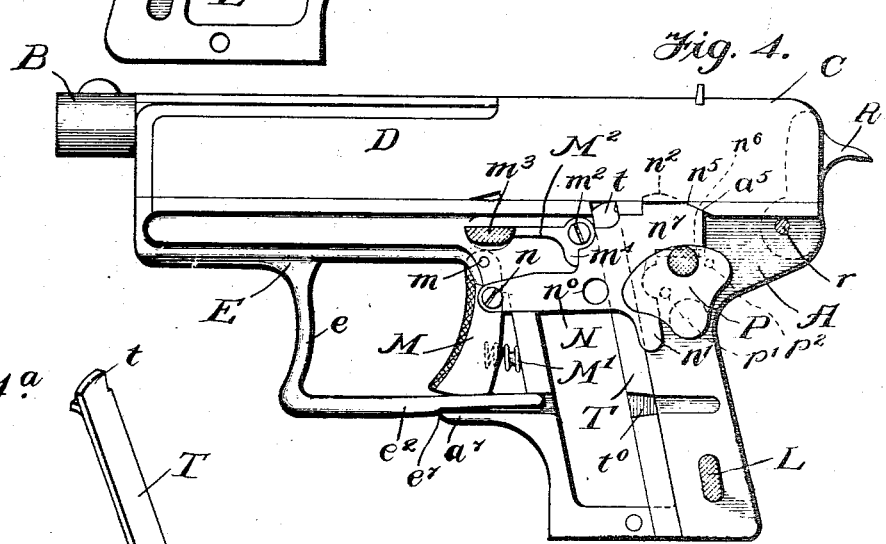
O. H. J. KRAG.
AUTOMATIC REPEATING FIREARM.
APPLICATION FILED AUG. 18, 1911.
1,028,032. Patented May 28, 1912.
4 SHEETS—SHEET 1.

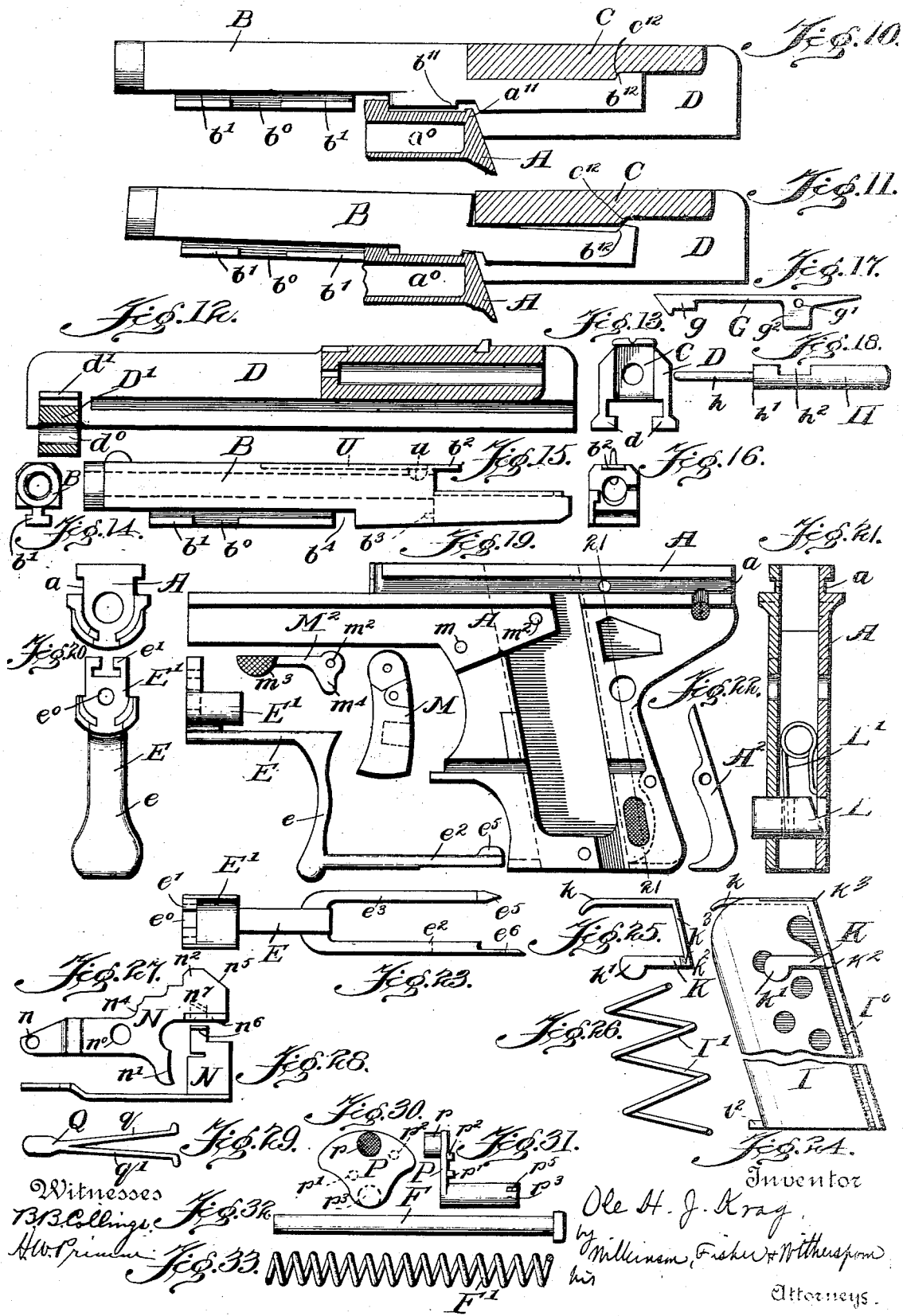

O. H. J. KRAG.
AUTOMATIC REPEATING FIREARM.
APPLICATION FILED AUG. 18, 1911.
1,028,032.
Patented May 28, 1912.
4 SHEETS—SHEET 4.
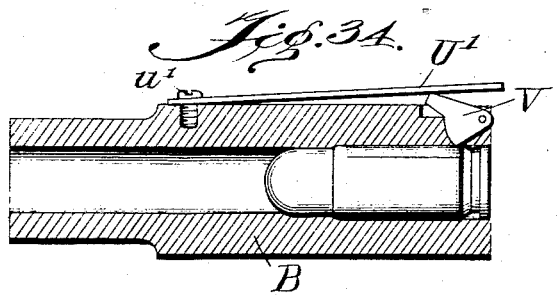
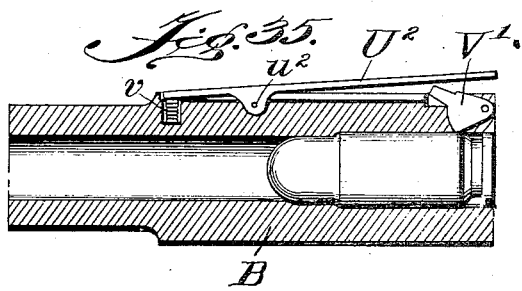
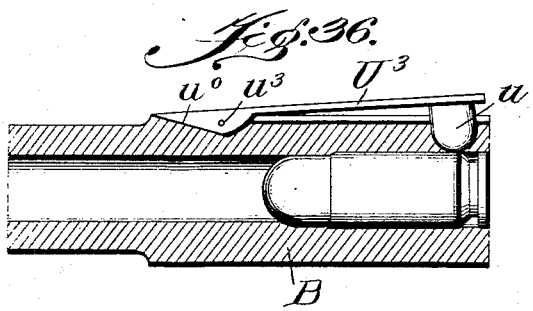
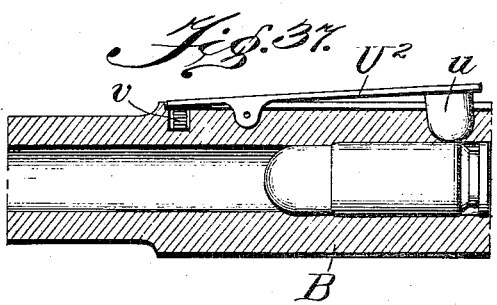
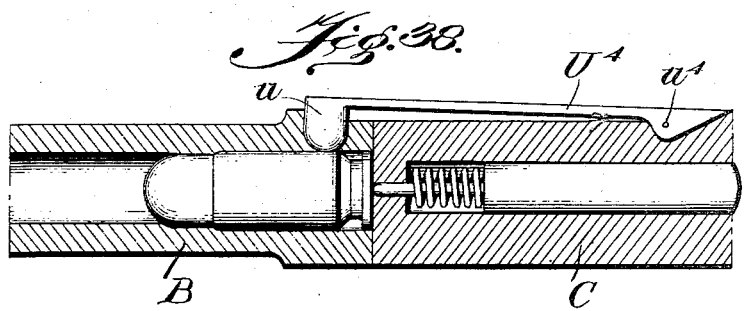
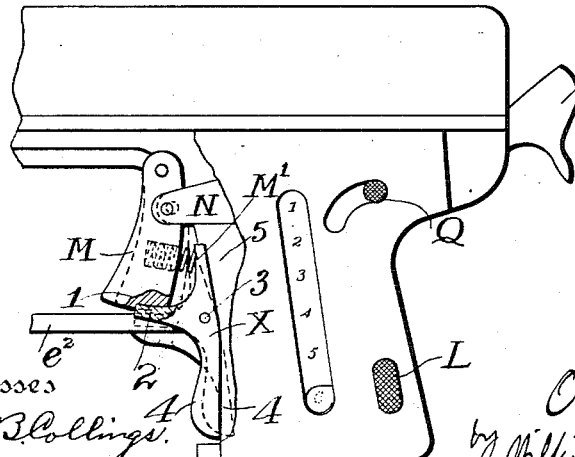

UNITED STATES PATENT OFFICE.

OLE HERMAN JOHANNES KRAG, OF ULLERN, NEAR CHRISTIANIA, NORWAY.

AUTOMATIC-REPEATING FIREARM.

1,028,032.  Specification of Letters Patent.  Patented May 28, 1912.

Application filed August 18, 1911. Serial No. 644,848.

*To all whom it may concern:*

Be it known that I, OLE HERMAN JOHANNES KRAG, subject of the King of Norway, residing at Ullern, near Christiania, in the Kingdom of Norway, have invented certain new and useful Improvements in Automatic Repeating Firearms; and I do hereby declare the following to be a full, clear, and exact description of the invention, such as will enable others skilled in the art to which it appertains to make and use the same.

My present invention relates to improvements in automatic repeating fire arms, and is especially applicable to repeating pistols of that class which can be discharged in rapid succession, as an automatic pistol, or which can be operated as a single loader, one hand only being required for controlling either of the operations at will.

This invention is especially intended to provide certain improvements over the structure as illustrated and described in my U. S. Patent #954,441, granted April 12, 1910.

My invention will be understood by reference to the accompanying drawings, in which the same parts are designated by the same letters or numerals throughout the several views.

Figure 1 is a side elevation of the complete weapon, parts being broken away. Fig. 2 is an end view as seen from the muzzle of the weapon. Fig. 3 shows the opposite side thereof, shown in Fig. 1, with the part of the magazine cover and magazine contents removed, and with the breech block in the rear position. Fig. 4 is a view similar to Fig. 1, but with the side plate of the handle and the magazine removed. Fig. 4ª shows a detent for the slide. Fig. 5 is a central vertical section through the weapon with the breech block in the rear position, and with the contents of the magazine chamber removed. Fig. 6 is a sectional elevation showing the method of removing the barrel; the contents of the magazine chamber are removed also for the sake of clearness in the drawings. Figs. 7, 8, 9, 10, and 11 show other methods of engaging the barrel in its housing and removing it therefrom. Fig. 7ª is a detail showing the double lever detached from the piece. Fig. 12 shows a central section through the breech block, and the slide to which the breech block is attached. Fig. 13 is an end view of the parts shown in Fig. 12 as seen from the right of said figure. Fig. 14 is an end view of the barrel as seen from the muzzle. Fig. 15 is a side elevation of the barrel. Fig. 16 is an end view of the barrel as seen from the breech block. Fig. 17 shows the extractor. Fig. 18 shows the firing pin. Fig. 19 is a disassembled view of the housing. Fig. 20 is an end view of the devices shown in Fig. 19, as seen from the left. Fig. 21 shows a section through Fig. 19 along the line 21—21. Fig. 22 is a detachable part of the casing. Fig. 23 is a detail showing a plan view of the finger guard. Fig. 24 shows the magazine with the magazine indicator attached. Fig. 25 is a detail showing the magazine indicator in elevation. Fig. 26 shows the feed spring for feeding the cartridges to the cartridge chamber. Fig. 27 shows the trigger blade in side elevation. Fig. 28 shows the trigger blade in plan. Fig. 29 is a detail showing the safety spring used in connection with the trigger blade. Fig. 30 is a side elevation of the safety plate and its pivot. Fig. 31 is a front elevation of the safety plate and its pivot. Figs. 32 and 33 show the guide rod and counter recoil spring. Figs. 34 to 38 show different modes of indicating whether the barrel is loaded or not, and Fig. 39 shows an auxiliary device for preventing the premature firing of the pistol.

A represents the housing in which the various parts are mounted. B represents the pistol barrel detachably mounted in said housing.

C represents the breech block made integral with or secured to the slide D, which reciprocates in the housing.

E represents the guard which bears against the forward end of the slide and draws same rearward.

F represents the guide pin mounted in the housing and carrying the return spring F'.

G represents the extractor which is carried by the slide.

H represents a firing pin mounted in the breech block and normally held in the rearward position by the spring H'.

I represents the magazine which contains the cartridges, and also the feed spring I' (see Figs. 24 and 26).

K represents the index which slides up and down in the magazine case to indicate the number of cartridges remaining therein.

L represents the lock to hold the cartridge magazine in place.

M represents the trigger, and M² an auxiliary trigger for the thumb. The trigger is normally pressed forward by the spring M'.

N represents the trigger blade pivoted to the trigger, as at $n$, and controlling the firing mechanism, as will be hereinafter more fully described.

P represents the safety attachment.

Q represents the spring forming part of the firing mechanism.

R represents the hammer.

S represents the sear.

T represents the stop for holding the slide back.

U represents an indicator for indicating whether cartridges are in the barrel or not.

As the main parts of the device have just been set forth, I will now proceed to describe the details.

The housing A is normally closed by detachable side plates A', and the curved rear plate A², the latter being shown in detail in Fig. 22, the former being shown in Fig. 1. One of the side plates is slotted, as shown in Fig. 1, to permit the inspection of the index which shows the number of cartridges in the magazine. The barrel B is detachably mounted in the housing, and the slide D is provided with grooves and engages ribs on the barrel and housing.

The front end of the slide D engages the housing and also guard E, the head E' of which (see Figs. 6, 19, 20 and 23) is provided with ribs $e'$, engaging in the groove above the rib $b'$ on the bottom of the barrel B, and when the slide D is moved far enough back to permit these ribs $e'$ to register with the break $b°$ (see Figs. 6 and 15), the barrel may be tilted up, the lug $b^3$ thereon rocking under the hook $a^3$ (see Figs. 5 and 6), the notch $b^4$ being cleared from the lug $a^4$ on the housing, and the barrel may be withdrawn from the pistol. The lug $b^2$ projecting from the rear end of the barrel engages in a socket $c^2$ in the breech block C, and prevents the first cartridge from being accidentally thrown out before it reaches the cartridge chamber, or the indicator U may also be prolonged to enter the socket and accomplish the same result.

The housing A is provided with a chamber $a°$ (see Figs. 5, 6, and 11), in which the return spring F' (Fig. 33) is mounted. This spring bears against the head D' of the slide D (Fig. 12) and the pin F (Fig. 32) is mounted to slide in the heads D' and E' (Fig. 6) and to be pressed by the spring F' against the rear wall of the chamber $a°$ of the housing. The slide D and the guard E are slidably connected to the housing by a rib and groove arrangement, such as is well known in the art.

The extractor G (see Figs. 3, 17, and 18) is mounted in the slide D, and has its hook $g$ engaging the rim of the cartridge case. This extractor is pivoted as at $g'$, and has a lug $g^2$ projecting into the notch $h^2$ in the firing pin H. This notch is somewhat longer than the lug $g^2$, so that the firing pin may have a slight longitudinal play relative to said lug; but yet is held safely in the breech block by said lug. The firing pin is shouldered as at $h'$, and is provided with a pin proper $h$, which is normally held masked in the breech block by means of the coil spring H' (see Figs. 5 and 18).

That part of the housing which comprises the handle of the pistol is chambered to receive the magazine I, which is preferably slotted, as at I°, to receive the inwardly projecting arm $k^2$ of the index K. The upper arm $k$ of said index is connected to the lower arm by the vertical strip $k^3$, and said upper arm rests under the cartridges, and is forced upward by the feed spring I', which tends to force the cartridges upward into the loading position. The lower arm $k'$ of said index K (see Figs. 1, 24, and 25) registers with the slot in the side A' of the housing A, and indicates the number of cartridges left in the magazine, figures being provided for this purpose. In Fig. 1, I have shown the magazine as arranged to receive six cartridges, and the position of the index indicates that three cartridges are still in the magazine.

The magazine is locked in place by means of the spring lock L, shown in detail in Fig. 21, and it is provided with a projecting lug $i^2$ to enable it to be pushed down when the spring lock L is released. This may be done by pushing the same in. Any convenient form of catch may be provided, and I do not claim this as part of my invention; but in Fig. 21 I have shown a movable locking pin L, normally held in the engaged position by the spring L', which may be pushed in to release the magazine, when desired.

M represents the trigger, which is pivoted to the housing as at $m$, and is normally pressed forward by the spring M'.

M² is an auxiliary trigger, which may be operated with the thumb from the side of the piece, if desired. This auxiliary trigger is pivoted, as at $m^2$, to the housing, and is provided with a projecting lug $m^3$ (see Fig. 4), and also with an arm $m^4$, engaging the trigger blade N, which is pivoted as at $n$ to the trigger M. This trigger blade N has a downwardly projecting arm $n'$, a cam face $n^5$, engaging the cam face $a^5$ on the housing A, and has a lug $n^2$ that projects up into a recess in the slide D (see Fig. 4).

P represents the safety attachment, which is pivoted on the arm $p^3$, and is provided with a thumb lug $p$ and with two lugs on the other face $p'$ and $p^2$. If the safety piece P be turned so that the lug $p'$ engages the arm $n'$ of the trigger blade, the trigger cannot be moved backward and the piece cannot be fired by pulling the trigger. On the other hand, if the lug $p^2$ be turned to engage the under side of the arm $n^7$ of the trigger blade, it will stop the downward movement; the lug $N^2$ will then prevent the slide D from being drawn back. When neither of these lugs is in engagement with the trigger blade, the piece may be fired automatically in rapid succession, as will be hereinafter described.

Q represents a spring secured in the housing A (see Fig. 3), and having arms $q$ and $q'$, the former having a tooth to engage in one of the notches $p^5$ of the pivot $p^3$ of the safety piece P, and thus serve as a detent for the same, while the other arm presses up against the web $n^6$ of the trigger blade N, shown in dotted lines in Fig. 4, and in full lines in Figs. 3, 27, and 28.

R represents a hammer, which is pivoted as at $r$, and is provided with a hammer pin $r'$ (see Fig. 5), engaging in the recess $s^\circ$ in the sear S, which sear is pivoted at $s$, and the tendency of the sear spring $s'$ is to force the sear down against the web $n^6$ of the trigger blade, and to hold the detent $s^2$ of the sear in engagement with the notch on the hammer, thus holding the hammer in the cocked position, as shown in Fig. 5. Now it will be seen that if the trigger blade N be pressed backward, either by means of the trigger M or the auxiliary trigger $M^2$, the cam face $n^5$ will be wedged down by the cam face $a^5$ (see Fig. 4) compressing the arm $q'$ of the spring Q (see Fig. 3), and releasing the sear (see Fig. 5), causing the hammer to strike the firing pin, the hammer moving from the cocked position shown in Fig. 1 to the firing position shown in Fig. 4.

T (see Figs. 4 and 4ᵃ) represents a detent traveling in a slide in the housing, and having a lug $t$ adapted to engage the slide, and hold the breech in the open position when desired. This detent is normally held out of engagement as shown in Fig. 4; but is moved upward to engage the slide when the magazine is empty, being pressed up by the magazine spring. This detent is shown in detail in Fig. 4ᵃ, and the notch $t^\circ$ engages the arm $e^2$ of the guard E, so that this detent can only be raised when the guard is in a forward position, and the breech open, and then is automatically raised by the magazine spring holding the slide to the rear.

The index K is used to show the number of cartridges in the magazine; but it is deemed desirable to show whether there is a cartridge in the cartridge chamber, in other words, to know for certain whether the piece is loaded or not. For this purpose, I provide an indicator U, shown at the top of Figs. 5 and 15, and modifications thereof are shown in Figs. 34 and 38.

Referring to the indicator shown in Figs. 5 and 15, a resilient strip U is secured to the top of the barrel, and is provided with a lug $u$, which projects into the cartridge chamber. When the cartridge is inserted, this lug $u$ is wedged up slightly, causing the free end of the strip U to project above the barrel. Of course, the strip may be placed at the side of the barrel, if desired; but this is shown at the top for the sake of clearness in the drawings, and is more readily noticed at the top than at the side.

In the modifications shown in Figs. 34 to 38, Fig. 34 shows a resilient strip U' bolted as at $u'$ to the barrel, and normally resting flush along the barrel, but being tripped by a cam plate or bell crank lever V, one edge of which projects into the cartridge chamber when the piece is not loaded.

In the modification shown in Fig. 35, the strip $U^2$ is pivoted to the barrel, as at $u^2$, and the spring $v$ normally holds the cam plate V' in the lowered position. When the cartridge is inserted, this cam plate is tripped upward, causing the strip $U^2$ to project above the barrel.

In the modification shown in Fig. 36, the resilient strip $U^3$ carries the lug $u$, and is sprung up about its pivot $u^3$ when the cartridge is inserted. The wedge face $u^\circ$ serves to check the upward movement of the free end of the strip $U^3$.

The modification shown in Fig. 37 is generally similar to that shown in Fig. 35, except that the lug $u$ is substituted for the cam plate V'.

In the form shown in Fig. 38, the strip $U^4$ is pivoted, as at $u^4$, to the breech block, or some part of the slide, instead of to the barrel, and the lug $u$ projects into the cartridge chamber except when the cartridge is inserted.

It is generally deemed desirable to lock the breech block and carrier to the barrel until the bullet has left the bore of the piece, so that there may not be a blast rearward when the slide flies back under the action of the pressure of the gases in the cartridge case. This is provided for, and at the same time, it is rendered feasible to readily remove the barrel by the mechanism which will now be described.

Referring to Figs. 7, 7ᵃ, 8, and 9, W represents a double lever, pivoted as at $w^\circ$ in the housing, and having two oppositely disposed arms $w$ and $w'$. The arms $w$ have cam faces on their upper sides, engaging cam grooves $d^8$ in the slide D, as shown most clearly in Fig. 7, and the arms $w'$ abut against lugs $b^9$ carried by the barrel.

The parts when the breech is closed and the piece ready for firing are shown in Fig. 7. Now if the piece be fired, the slide and barrel will both move to the rear; but for an instant the slide will be retarded by the double lever W, the cam arms $w$ of which will be cammed down by the cam groove $d^8$ on the slide. At the time the slide is moving slightly to the rear, the barrel is also simultaneously moved to the rear by the arms $w'$ engaging against the lugs $b^9$ on the barrel, and thus the barrel and slide are held together during the brief interval that the bullet is passing out of the bore. At the instant that the bullet passes from the bore, the end of the rib $b'$ brings up against the abutment $a^4$ on the housing, and arrests the further rearward movement of the barrel. While the cam arms $w$ of the double lever W. are clear of the slide, the parts then being in the position shown in Fig. 8, the slide is free to continue its movement rearward under the influence of its own inertia, but opposed by the return spring $F'$. On the return stroke, when the breech block strikes the breech end of the barrel, its inertia will push the barrel forward slightly to the original position shown in Fig. 7.

When the parts are in the position shown in Fig. 8, if it be desired to remove the barrel, it will be sufficient to draw the guard backward until the head $D'$ of the slide, and the ribs $e'$ of the guard, register with the break $b°$ in the ribs $b'$ on the barrel, when the barrel may be tilted up, as shown in Figs. 6 and 9, and may be drawn forward and upward out of the slide and housing.

Instead of using the double lever W, as shown in Fig. 8, the barrel and slide may be locked together and released from each other as shown in Figs. 10 and 11. In Fig. 10, the barrel and slide are shown in the forward position, to which they would normally be brought by the return spring. Now if the piece be fired, the barrel and slide would both recoil together until the rib $b^{11}$ on the barrel struck the abutment $a^{11}$ on the housing. After this, the inclined face $c^{12}$ on the breech block will wedge down on the inclined face $b^{12}$ on the barrel, tilting the breech of the barrel down slightly, and permitting the slide to continue its rearward travel, as shown in Fig. 11. If the slide be held to the rear, and the parts D and $E'$ be brought into the position to be disconnected from the rib $b'$ on the barrel (see Fig. 6), the barrel may be still further tilted up and removed from the slide and housing. It will be obvious that when the slide returns nearly to the initial forward position, the breech block will strike the breech of the barrel and tilt the same forward slightly; while at the same time, the cam face $b^{12}$ of the barrel will swing up behind the cam face $c^{12}$ of the breech block, and the parts will be in the position shown in Fig. 10.

With any pistol it is eminently desirable to prevent accidental discharge of the piece, and it is especially desirable with automatic pistols where the accidental discharge of a single shot may be followed by a rapid succession of shots and distributed in various directions. According to this device the trigger M is notched, as at 1, to engage the detent arm 2 of the bell crank lever X, pivoted to the handle as at 3, having a downwardly projecting finger grip 4 and an upwardly projecting arm 5 engaging the trigger spring $M'$. It will be evident that this spring $M'$ will tend to hold the detent arm 2 in engagement with the notch 1, and if the trigger M be pulled in a backward direction, it will be arrested by the detent 2. Now, if at the same time the trigger is pulled backward, or prior thereto, the finger grip 4 is also pulled backward, the detent 2 will clear the notch 1, and the trigger can be moved backward against the action of its spring $M'$, as shown in dotted lines in Fig. 39. Should the trigger and the bell crank lever be released, the spring $M'$ will restore the parts to the safety position. It will be obvious that holding the trigger M in place will also lock the trigger blade N and the parts operated thereby. It will be seen that a safety attachment is provided which does not require inspection, and which may be controlled in the dark, and at all times, without requiring any special intelligence.

The operation of the device is as follows:— Draw back on the guard E, which will draw back the slide D, thus opening the breech, the parts then being in the position shown in Fig. 5. It will be noted that the lower part of the breech block C will engage the face of the hammer R, and will cock the piece, causing the detent $s^2$ to engage in the notch on the hammer. Now insert a cartridge, or insert the magazine, if desired, and release the guard, the spring $F'$ will force the slide, and with it the guard, to the initial position shown in Fig. 1; and in the meantime, the cartridge will be forced into the cartridge chamber, as shown in Fig. 1. Now if it be desired to fire in rapid succession, the magazine being in place and charged, and the safety device being in the proper position, it will be sufficient to pull on the trigger $M^2$, or the trigger M, and the hammer will be tripped, as will be hereinafter described, and the cartridge will be fired. The pressure of the gases in the cartridge chamber will force the breech block backward against the operation of the spring $F'$, when another cartridge will be automatically inserted, and the spring $F'$ will normally restore the parts to the position shown in Fig. 1, and the second cartridge will be fired, the slide continuing to reciprocate and to fire the cartridges *seriatim* until the magazine is exhausted. When the magazine is exhausted, the magazine spring will push the detent T up to engage in the slide, and hold the same open, and the piece cannot be fired. In order to draw down the detent $t$, when the fresh magazine is inserted, or when it is desired to operate the piece as a single loader, the arm $e^2$ of the guard E will project into the cam groove $t^o$ on the detent T, and will wedge the detent down until the catch $t$ is disengaged from the slide. In order to act as a single firer, it will only be necessary to draw the slide back by the guard E and the piece can be charged singly by hand.

The operation of the firing mechanism is as follows:—Pulling on either of the triggers M or $M^2$ will cause the trigger blade N to move backward slightly, and the cam face $n^5$, engaging the cam face $a^5$, will also cause the heel of the trigger blade to move downward slightly. This slight downward movement will cause the arm $n^6$ of the trigger blade (see Figs. 5, 27, and 28) to wedge backward and downward against the inclined face $s^3$ of the sear S. This will trip the sear slightly, causing the detent $s^2$ to clear the catch on the hammer R, and the spring $s'$ will rotate the hammer, causing the same to strike the firing pin and fire the cartridge. It will be obvious that forcing the slide D backward would cock the hammer; while the trigger being held back as in automatic firing, would keep the detent $s^2$ normally clear of the catch on the hammer, and therefore the spring $s'$ would be free to act whenever the breech reached its closed position, the hammer at that time passing clear of the lower edge $c^3$ of the breech block C.

The two arms $e^2$ and $e^3$ of the guard E not only serve to steady the guard, but the one serves to operate the detent T, and the other, on the opposite side, is provided with a web $e^6$, which brings up against the rib $a^6$ of the housing, and thus prevents the guard from being thrown out of place when it is carried rapidly forward under the action of the spring F'. It will be noted that this guard pulls back the slide, and is returned to the initial position with the slide, under the action of the spring F'; but when it has returned to the initial position, it does not interfere in any way with the vibratory motion of the slide.

In order to prevent the guard from rebounding, and possibly injuring the finger of the person firing the pistol, there is a short notch $e^7$ in the lower side of the arm $e^2$, which brings up against the abutment $a^7$ on the handle, the said arm $e^2$ being normally clear of the trigger when it is in its forward position, but pressing same down and causing this notch $e^7$ to engage said abutment $a^7$ when the trigger is drawn backward to the firing position. Thus it will be seen that the guard E cannot be moved back from the forward position so long as the trigger is held back.

Having thus described my invention, what I claim and desire to secure by Letters Patent in the United States is:—

1. In an automatic pistol, the combination with a housing, of a slide mounted to move longitudinally on said housing, and provided with a T-shaped groove, a barrel provided with T-shaped ribs slotted along a portion of their length, adapted to engage said T-shaped groove in the slide, and to be released from engagement therewith at a predetermined position when said slide is drawn rearward, with means controlled by said slide for normally locking the barrel on the housing, substantially as described.

2. In an automatic pistol, the combination with a housing, of a slide mounted to move longitudinally on said housing, and provided with a T-shaped groove, a barrel provided with T-shaped ribs slotted along a portion of their length, adapted to engage said T-shaped groove in the slide, and to be released from engagement therewith at a predetermined position when said slide is drawn rearward, a guard sliding in said housing in front of said slide, and provided with a T-shaped groove engaging the ribs of the barrel, and a return spring normally pressing said slide and said guard forward relative to said housing, substantially as described.

3. In an automatic pistol, the combination with a housing, of a barrel, a slide carrying the breech block, detachably connected with said housing, a sliding guard also detachably connected to said housing, and projecting in front of said slide, the said slide and guard normally locking said barrel in said housing, and means operable by moving said guard and slide longitudinally for releasing said barrel from engagement with said slide and guard, thereby permitting the tilting of the barrel and the withdrawal of the same, substantially as described.

4. In an automatic pistol, the combination with a housing, of a slide mounted to move longitudinally on said housing, and provided with a T-shaped groove, a barrel having a limited longitudinal play in said housing, and provided with T-shaped ribs slotted along a portion of their length, adapted to engage said T-shaped groove in the slide, and to be released from engagement therewith at a predetermined position when said slide is drawn rearward, means for locking the slide and barrel together during the rearward movement of said barrel, and for detaching the slide from the barrel thereafter, and means controlled by said slide for normally locking the barrel in the housing, substantially as described.

5. In an automatic pistol, the combination with a housing, of a slide mounted to move longitudinally on said housing, and provided with a T-shaped groove, a barrel having a limited longitudinal play in said housing, and provided with T-shaped ribs slotted along a portion of their length, adapted to engage said T-shaped groove in the slide, and to be released from engagement therewith at a predetermined position when said slide is drawn rearward, a guard sliding in said housing in front of said slide, and provided with a T-shaped groove engaging the ribs of the barrel, means for locking the slide and barrel together during the rearward movement of said barrel, and for detaching the slide from the barrel thereafter, and a return spring normally pressing said slide and said guard forward relative to said housing, substantially as described.

6. In an automatic pistol, the combination with a housing, of a barrel having a limited longitudinal play on said housing, a slide carrying the breech block, detachably connected with said housing, a sliding guard also detachably connected to said housing, and projecting in front of said slide, the said slide and guard normally locking said barrel in said housing, means for locking the slide and barrel together during the rearward movement of said barrel, and for detaching the slide from the barrel thereafter, and means operable by moving said guard and slide longitudinally for releasing said barrel from engagement with said slide and guard, thereby permitting the tilting of the barrel and the withdrawal of the same, substantially as described.

7. In an automatic pistol, the combination with a housing, of a barrel and a ribbed slide mounted thereon, means for detachably connecting said barrel to said housing, slotted ribs on said barrel, a return spring mounted in said housing, a guard engaging said slide and provided with ribs engaging the ribs on said barrel, the said ribs on the guard and slide being adapted to register with the slots in the ribs on the barrel when the guard and slide are drawn rearward the said guard sliding in said housing and being normally held in the forward position by said spring, whereby the barrel may be held normally locked on said housing, but may be tilted up and removed therefrom when said guard is drawn backward, substantially as described.

8. In an automatic pistol, the combination with a housing, of a slide mounted to move longitudinally on said housing, a barrel mounted in said slide and housing, a guard sliding in said housing and having its head projecting in front of said slide, the said guard having two rearwardly projecting arms engaging in said housing on opposite sides of the magazine chamber, and a return spring normally pressing said slide and said guard forward relative to said housing, substantially as described.

9. In an automatic pistol, the combination with a housing, of a slide mounted to move longitudinally on said housing, a barrel mounted in said slide and housing, a guard sliding in said housing and having its head projecting in front of said slide, the said guard having two rearwardly projecting arms engaging in said housing on opposite sides of the magazine chamber, one of said arms traveling in a slot in said housing and having an enlarged head engaging in a groove in the housing, thus acting as a stop for the forward movement of said guard, substantially as described.

10. In an automatic pistol, the combination with a housing, of a slide mounted to move longitudinally on said housing, a barrel mounted in said slide and housing, a guard sliding in said housing and having its head projecting in front of said slide, the said guard having two rearwardly projecting arms engaging in said housing on opposite sides of the magazine chamber, one of said arms being notched to engage a detent on said housing when pressed downward, and a trigger pivoted to said housing and adapted to engage said arm when pressed downward, whereby the rearward motion of said guard is prevented, substantially as described.

11. In an automatic pistol, the combination with a housing, of a slide mounted to move longitudinally on said housing, a barrel mounted in said slide and housing, a guard sliding in said housing and having its head projecting in front of said slide, the said guard having two rearwardly projecting arms engaging in said housing on opposite sides of the magazine chamber, one of said arms being notched to engage a detent on said housing when pressed downward, and a trigger pivoted to said housing and adapted to engage said arm when pressed downward, whereby the rearward motion of said guard is prevented, the other of said arms traveling in a slot in said housing and having a head engaging the end of said slot when the guard is in the forward position, substantially as described.

12. In an automatic pistol, the combination with a housing, of a slide mounted to move longitudinally on said housing, a barrel having limited longitudinal motion in said housing with sliding connection between said barrel and said slide, and means for locking said barrel to said slide during the limited longitudinal rearward movement of said barrel, and automatically releasing said barrel from said slide after such longitudinal movement of the barrel is arrested, substantially as described.

13. In an automatic pistol, the combination with a housing, of a barrel having limited longitudinal motion therein, a slide carrying the breach block, detachably connected with said housing, a sliding guard also detachably connected to said housing, and projecting in front of said slide, the said slide and guard normally locking said barrel in said housing, and means for locking said barrel during its limited rearward motion, to said slide, and then automatically releasing it therefrom, substantially as described.

14. In an automatic pistol, the combination with a housing, of a barrel, a slide carrying the breech block, detachably connected with said housing, a sliding guard also detachably connected to said housing, and projecting in front of said slide, the said slide and guard normally locking said barrel in said housing, a trigger, and means controlled by the movement of said trigger for locking said guard against rearward movement, substantially as described.

15. In an automatic pistol, the combination with a housing, of a barrel, a slide carrying the breech block, detachably connected with said housing, a sliding guard also detachably connected to said housing, and projecting in front of said slide, the said slide and guard normally locking said barrel in said housing, a trigger, and means controlled by the movement of said trigger for locking said guard against rearward movement, said means comprising a notched arm projecting rearward from said guard in line with the rearward movement of the trigger, and a detent in said housing adapted to engage said arm when pressed down by said trigger, substantially as described.

16. An indicator for use with magazine fire arms, comprising a resilient sliding member K, having an arm $k'$ movable exterior to the magazine, an inwardly projecting arm $k^2$ projecting into the magazine, a vertical strip $k^3$ and a cross arm $k$ engaging the top of the feed spring, substantially as described.

17. In a safety attachment for small arms, the combination with a trigger provided with a notch and a spring engaging said trigger, of a three-arm lever having one arm serving as a detent to engage said notch, a second arm normally engaging said spring and tending to keep said detent in engagement with said notch, and a third arm adapted to be pressed by the finger simultaneously with the pulling of said trigger, substantially as described.

18. In fire arms, the combination with a trigger, a spring normally pressing said trigger to the forward position, a detent also engaging said spring the latter normally holding said detent and said trigger engaged, and means for releasing said detent simultaneously with the pulling of said trigger, substantially as described.

19. In an automatic fire arm, the combination with a housing and a reciprocating slide mounted therein, of a magazine mounted in the housing, a feed spring mounted in said magazine, and a sliding detent mounted in the housing, with means actuated by said feed spring for pressing said detent upward in the path of the slide when the magazine is empty, the said detent being provided with a cam slot, and a sliding guard connected to the housing, having an arm projecting into said cam slot and withdrawing said detent from engagement with said slide when said guard is drawn to the rear, substantially as described.

20. In an automatic fire arm, the combination with a housing and a slide reciprocating therein, of the trigger pivoted to said housing and normally pressed forward by a spring, a trigger plate pivoted to said trigger and provided with a rearwardly and upwardly extending heel, said heel having a cam face adapted to engage a corresponding cam face on the housing and having a cam lug projecting up into a recess in the slide, a pivoted safety attachment adapted to hold the heel of said trigger plate in a locked position or to release same when desired, and a spring serving as a detent for said safety device and as a yielding support for the heel of said trigger plate, substantially as described.

21. In an automatic fire arm the combination with a housing and a slide reciprocating therein, of the trigger pivoted to said housing and normally pressed forward by a spring, a trigger blade pivoted to said trigger and provided with a rearwardly and upwardly extending heel, said heel having a cam face adapted to engage a corresponding cam face on the housing and having a cam lug projecting up into a recess in the slide, a pivoted safety attachment adapted to hold the heel of said trigger blade in a locked position or to release same when desired, and a spring serving as a detent for said safety device and as a yielding support for the heel of said trigger blade, with an auxiliary trigger projecting laterally from the side of the barrel and operable by the thumb for operating said trigger blade, substantially as described.

22. In an automatic fire arm, the combination with a housing and a slide reciprocating therein, of the trigger pivoted to said housing and normally pressed forward by a spring, a trigger blade pivoted to said trigger and provided with a rearwardly and upwardly extending heel, said heel having a cam face adapted to engage a corresponding cam face on the housing and having a cam lug projecting up into a recess in the slide, a pivoted safety attachment adapted to hold the heel of said trigger blade in a locked position or to release same when desired, and a spring serving as a detent for said safety device and as a yielding support for the heel of said trigger blade, with a finger operated detent engaging the trigger spring and normally locking the trigger and trigger blade except when said finger operated detent and trigger are pressed backward, substantially as described.

23. In an automatic fire arm, the combination with a housing and a slide reciprocating therein, of the trigger pivoted to said housing and normally pressed forward by a spring, a trigger blade pivoted to said trigger and provided with a rearwardly and upwardly extending heel, said heel having a cam face adapted to engage a corresponding cam face on the housing and having a cam lug projecting up into a recess in the slide, and a spring forming a yielding support for the heel of said trigger blade, substantially as described.

24. In an automatic fire arm, the combination with a housing and a slide reciprocating therein, of the trigger pivoted to said housing and normally pressed forward by a spring, a trigger blade pivoted to said trigger and provided with a rearwardly and upwardly extending heel, said heel having a cam face adapted to engage a corresponding cam face on the housing and having a cam lug projecting up into a recess, a spring serving as a yielding support for the heel of said trigger blade, and an auxiliary trigger projecting laterally from the side of the barrel and operable by the thumb for operating said trigger blade, substantially as described.

25. In an automatic fire arm, the combination with a housing and a slide reciprocating therein, of the trigger pivoted to said housing and normally pressed forward by a spring, a trigger blade pivoted to said trigger and provided with a rearwardly and upwardly extending heel, said heel having a cam face adapted to engage a corresponding cam face on the housing and having a cam lug projecting up into a recess in the slide, a spring serving as a yielding support for the heel of said trigger blade, and a finger operated detent engaging the trigger spring and normally locking the trigger and trigger blade except when said finger operated detent and trigger are pressed backward, substantially as described.

26. In an automatic fire arm, the combination with a housing and a slide reciprocating therein, of the trigger pivoted to said housing and normally pressed forward by a spring, a trigger blade pivoted to said trigger and provided with a rearwardly and upwardly extending heel, said heel having a cam face adapted to engage a corresponding cam face on the housing and having a cam lug projecting up into a recess in the slide, a hammer having a notch on its heel, a hammer rod, a hammer spring mounted on said hammer rod, a pivoted sear having a detent normally engaging said notch under the action of said hammer spring, and an arm on said trigger blade adapted to move said sear, and release said detent when said trigger blade is operated, and a spring forming a yielding support for the heel of said trigger blade, substantially as described.

27. In an automatic fire arm, the combination with a housing and a slide reciprocating therein, of the trigger pivoted to said housing and normally pressed forward by a spring, a trigger blade pivoted to said trigger and provided with a rearwardly and upwardly extending heel, said heel having a cam face adapted to engage a corresponding cam face on the housing and having a cam lug projecting up into a recess, a spring serving as a yielding support for the heel of said trigger blade, a hammer having a notch on its heel, a hammer rod, a hammer spring mounted on said hammer rod, a pivoted sear having a detent normally engaging said notch under the action of said hammer spring, and an arm on said trigger blade adapted to move said sear, and release said detent when said trigger blade is operated, and an auxiliary trigger projecting laterally from the side of the barrel and operable by the thumb for operating said trigger blade, substantially as described.

28. In an automatic fire arm, the combination with a housing and a slide reciprocating therein, of the trigger pivoted to said housing and normally pressed forward by a spring, a trigger blade pivoted to said trigger and provided with a rearwardly and upwardly extending heel, said heel having a cam face adapted to engage a corresponding cam face on the housing and having a cam lug projecting up into a recess in the slide, a spring serving as a yielding support for the heel of said trigger blade, a hammer having a notch on its heel, a hammer rod, a hammer spring mounted on said hammer rod, a pivoted sear having a detent normally engaging said notch under the action of said hammer spring, and an arm on said trigger blade adapted to move said sear, and release said detent when said trigger blade is operated, and a finger operated detent engaging the trigger spring and normally locking the trigger and trigger blade except when said finger operated detent and trigger are pressed backward, subtantially as described.

In testimony whereof, I affix my signature, in presence of two witnesses.

OLE HERMAN JOHANNES KRAG.

Witnesses:
H. T. McKEEVER,
D. LEWIS MATTERN.